UNITED STATES PATENT OFFICE.

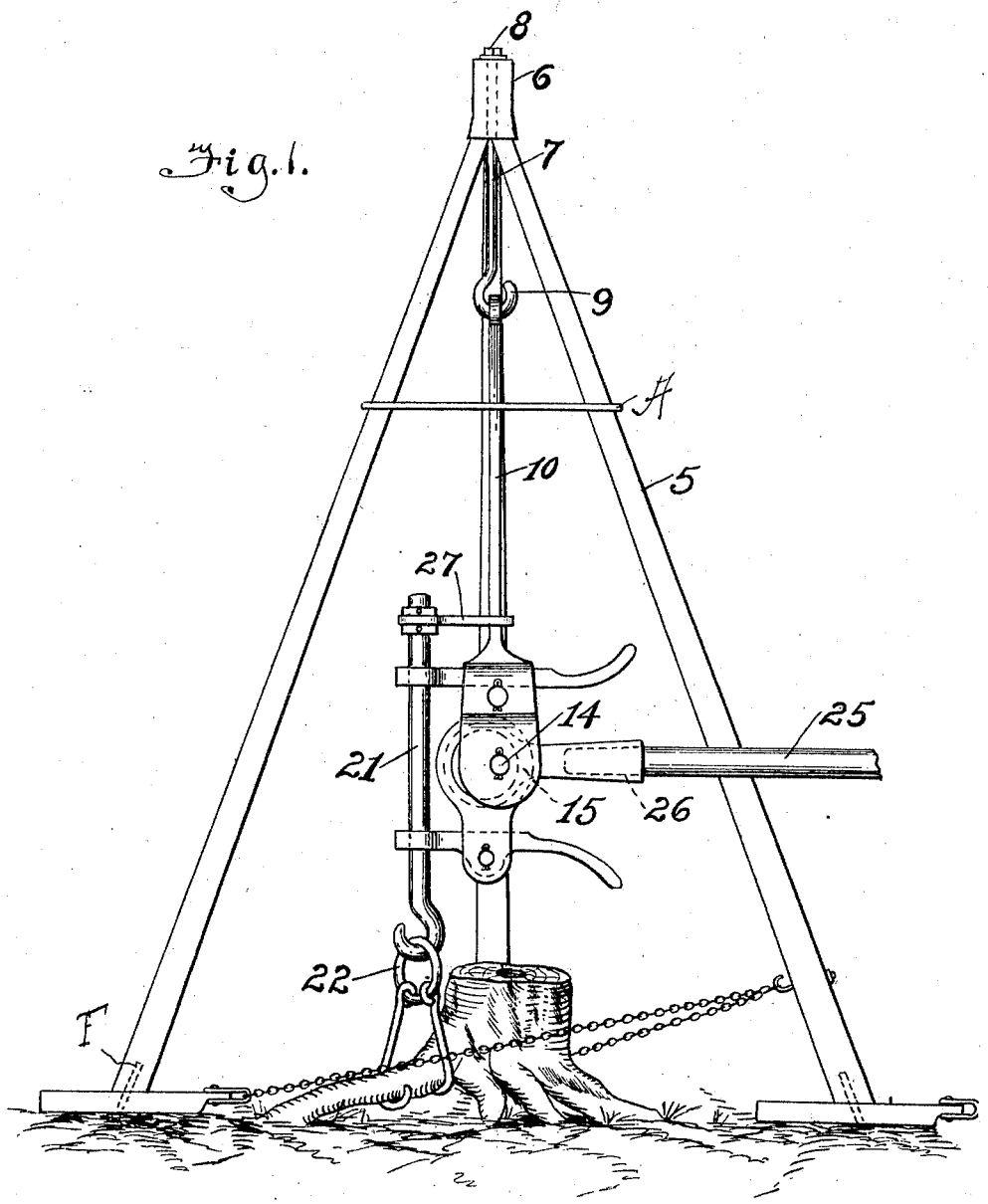

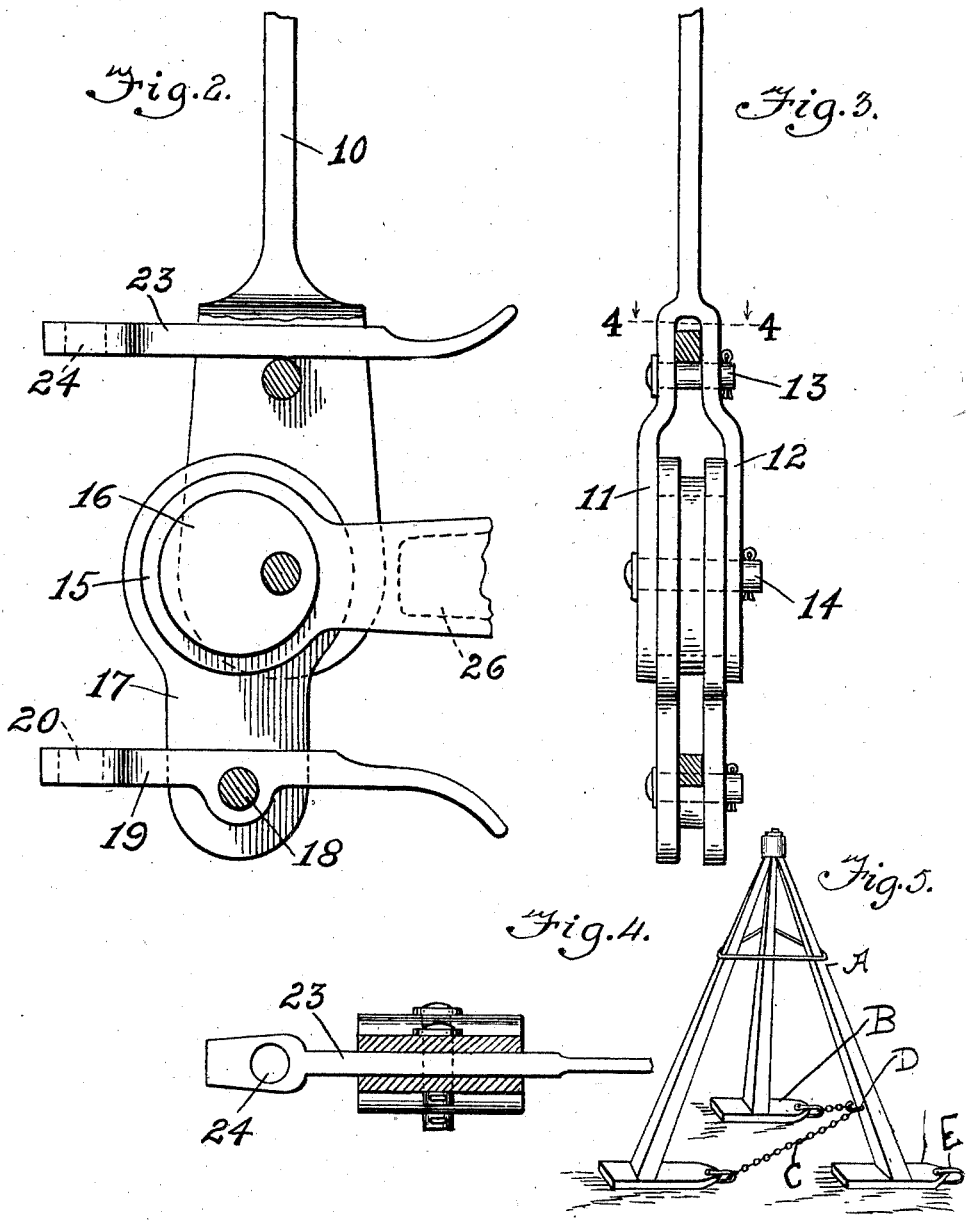

EDWARD C. ANDERSON, OF MILACA, MINNESOTA.

STUMP-PULLER.

967,300.  Specification of Letters Patent.  Patented Aug. 16, 1910.

Application filed May 28, 1910. Serial No. 563,965.

*To all whom it may concern:*

Be it known that I, EDWARD C. ANDERSON, a citizen of the United States of America, and resident of Milaca, in the county of Millelacs and State of Minnesota, have invented certain new and useful Improvements in Stump-Pullers, of which the following is a specification.

This invention relates to hoisting machinery and particularly to a class thereunder known as stump pullers.

An object of this invention is to produce a device adapted to pull stumps, the said device being operated by a step by step movement of an operating handle whereby the leverage of the handle is conveyed to the stump through the medium of a cam and wherein clutches or dogs are utilized for the purpose of communicating the motion of the lever to the stump and for retaining the said connection in an advanced position while the companion dog or clutch is being readjusted on a lower plane for the purpose of elevating the stump connection another degree or step.

A still further object of this invention is to produce a stump puller which is detachably connected to a tripod in order that the same may be knocked down for transportation and readily reassembled when the same is to be used and the invention has for another object the provision of a stump puller which will possess advantages in points of simplicity, efficiency and durability, proving at the same time comparatively inexpensive to manufacture.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views in which—

Figure 1 illustrates a view in elevation of a stump puller embodying the invention; Fig. 2 illustrates an enlarged detail view in section of the lever and its connection with the apparatus; Fig. 3 illustrates an end view of the hoisting mechanism; and Fig. 4 illustrates a sectional view on the line 4—4 of Fig. 3 with the clutch thereof in plan. Fig. 5 illustrates a perspective view of the tripod.

In these drawings 5 denotes a tripod which may be of any appropriate construction here shown as having a head 6 through which a rod 7 is extended and secured by a nut 8, the lower end of said rod terminating in a hook 9.

The stump hoisting apparatus proper comprises a hanger 10 suspended from the hook 9, said hanger having a bifurcated lower end forming the forks 11 and 12 through which a pin 13 is extended near the junction of the forks and the hanger proper. A pivot 14 of the head 15 extends through the forks 11 and 12 and is partially rotatable therein and said head is provided with flanges 16 on each side thereof which are eccentric to the pivot 14 and form cams which enter the apertures of the links 17. Near the lower ends of the links, I provide a pin 18 on which a clutch 19 is pivoted, the said clutch having an aperture 20 for the reception of the shank of the hook 21 which hook has grapples 22 which are connected to the stump that is to be pulled or to the roots thereof. A detent 23 has an aperture 24 to receive the shank of the hook 21 and said detent extends between the pin 13 and the junction of the prongs with the hanger proper and said detent serves to retain the hook in its elevated position while the clutch 19 is moving longitudinally of the shank of the hook for the purpose of gripping the said shank at a point near the hook in order that upward movement of the links 17 will cause the clutch to clamp the shank of the hook and elevate it according to the degree of movement of the lever 25 which lever is connected to the socket 26 of the head.

By inspecting Fig. 2, it will be observed that owing to the eccentricity of the head, movement of the head on its pivot will result in elevating and lowering the links in relation to the hanger and with each descent of the links the clutch will move downwardly on the shank of the hook and with each upward movement of the links, the said clutch will clamp the shank of the hook and carry the hook upwardly. The detent will operate to hold the hook elevated as heretofore indicated so that the hook will be moved upwardly step by step under the influence of the lever as heretofore described.

Owing to the camming connection between the head and the links, the hoisting action may be carried on with the application of a comparatively limited amount of power to the lever.

The upper end of the shank of the hook 21 is provided with a guiding arm 27 which is connected to the shank of the hook at one end and has its opposite end embracing the hanger 10 so that as the hook 21 is moved the arm 27 retains the hook and hanger approximately parallel.

I provide the tripod with a brace A which embraces the standards and I provide the said standards with shoes B which will slide over the surface of the ground when the tripod is to be moved. Chains or other devices C are connected to the shoes and to one of the standards through the medium of a staple D or the like so that when pull is directed on the link E of one of the shoes the whole tripod may be moved. The shoes are attached to the standards in any approved way as for instance through the medium of the pins F.

I claim—

1. In a stump puller, a hanger, means for suspending the hanger, a head pivoted to the hanger, eccentrics on the heads, links to which the eccentrics are connected, a clutch pivoted to the links, a detent carried by the hanger, a member engaged by the clutch and detent, and means for connecting said member to the object to be hoisted.

2. In a stump puller, a hanger, means for suspending the hanger, a head having eccentrics thereon, means for mounting the head on the hanger, links to which the eccentrics are connected, a clutch pivoted to the links and having an aperture in its end, a hook having a shank extending through the said aperture, a detent having an aperture to receive the shank of the hook, means for retaining the detent in the hanger, and means for connecting the hook to an object to be pulled.

3. In a stump puller, a hanger having a bifurcated lower end, a pin through said lower end, a head having a pivot extending through the bifurcated end of the hanger, said head having eccentrics thereon, links having apertures to receive the eccentrics, a clutch pivoted to the links, a detent carried by the hanger, and a member engaged by the clutch and detent.

In testimony whereof I hereunto affix my signature in the presence of two witnesses.

EDWARD C. ANDERSON.

Witnesses:
ALFRED SANDSTROM,
B. E. ERICKSON.